United States Patent

Aalto et al.

[11] Patent Number: 6,006,093
[45] Date of Patent: Dec. 21, 1999

[54] TRAFFIC CONTROL METHOD IN A HIERARCHICAL COMMUNICATION SYSTEM

[75] Inventors: Risto Aalto, Riihimaki; Tomi Vaara, Espoo, both of Finland

[73] Assignee: Nokia Telecommunications Oy, Espoo, Finland

[21] Appl. No.: 08/750,520

[22] PCT Filed: Jun. 12, 1995

[86] PCT No.: PCT/FI95/00342

§ 371 Date: Dec. 12, 1996

§ 102(e) Date: Dec. 12, 1996

[87] PCT Pub. No.: WO95/35007

PCT Pub. Date: Dec. 21, 1995

[30] Foreign Application Priority Data

Jun. 13, 1994 [FI] Finland ................................. 942804

[51] Int. Cl.[6] ............................................. H04Q 7/20
[52] U.S. Cl. ...................... 455/443; 455/444; 455/522
[58] Field of Search .................................. 455/422, 432, 455/436–438, 440–441, 443–444, 450, 452, 453, 524, 525, 62, 522

[56] References Cited

U.S. PATENT DOCUMENTS

| | | | |
|---|---|---|---|
| 5,239,682 | 8/1993 | Strawcynski et al. | 455/62 |
| 5,499,386 | 3/1996 | Karlsson | 455/444 |
| 5,504,939 | 4/1996 | Mayrand et al. | 455/450 |
| 5,548,806 | 8/1996 | Yamaguchi et al. | 455/444 |

FOREIGN PATENT DOCUMENTS

| | | |
|---|---|---|
| 2 255 474 | 11/1992 | United Kingdom . |
| 2 284 321 | 5/1995 | United Kingdom . |
| 92/02105 | 2/1992 | WIPO . |
| 95/02309 | 1/1995 | WIPO . |

*Primary Examiner*—Nguyen Vo
*Attorney, Agent, or Firm*—Pillsbury Madison & Sutro LLP

[57] ABSTRACT

A traffic control method in a hierarchical mobile communication system which has mobile stations, a microcell network primarily intended to be used by mobile stations of a relatively lower transmitting power class, and a macrocell network which at least partly overlays the microcell network and is primarily intended to be used by mobile stations of a relatively higher transmitting power class to control traffic by a handover so that, apart from measurements of the radio path, the transmitting power class of the mobile station and the cell type of the neighboring cell are also taken into account in the handover decision so that only a neighboring cell of the cell type which the mobile station should primarily use on the basis of its transmitting power class is selected as the target cell for the handover.

2 Claims, 3 Drawing Sheets

TRAFFIC CONTROL METHOD IN A HIERARCHICAL COMMUNICATION SYSTEM

This application is the national phase of international application PCT/F195/00342, filed Jun. 12, 1995 which is designated the U.S.

FIELD OF THE INVENTION

The present invention relates to a traffic control method in a hierarchical mobile communication system which comprises mobile stations, a microcell network primarily intended to be used by mobile stations of a relatively lower transmitting power class, a macrocell network which at least partly overlays the microcell network and which macrocell network is primarily intended to be used by mobile stations of a relatively higher transmitting power class.

BACKGROUND OF THE INVENTION

The geographical area covered by a typical cellular mobile systems is divided into smaller radio coverage areas, cells, to achieve a more efficient utilization of the frequency band through frequency re-use. The size of cells varies from a mobile system to another as well as geographically within a mobile system, depending on a multitude of factors, such as the capacity required (number of channels, terrain, transmitting power levels, etc.). One factor which influences cell size is the maximum transmitting power of a mobile station. The mobile stations in conventional mobile systems were vehicle-mounted high-power radio stations. In addition to these, small hand-held mobile stations have emerged; these mobile stations have a considerably lower transmitting power than the vehicle-mounted stations in order to reduce power consumption, for example. These hand-held mobile stations have a considerably smaller range of operation and, as a result, the cell size must also be smaller.

In modern mobile communication systems, both low-power hand-held mobile stations and vehicle-mounted mobile stations that have a higher output power are used side by side. Further, hierarchical networks with geographically at least partly overlaying large macrocells and small microcells have been employed in the mobile communication systems. It would be advantageous if high-power mobile stations were assigned to a macrocell network, and low-power hand-held mobile stations to a microcell network. Because the high-power vehicle-mounted stations, moreover, usually move in the network with higher speed than the hand-held mobile phones, the use of macrocells results in a smaller number of handovers. The hand-held mobile stations are, in turn, relatively immobile and thus the number of handovers will not be unreasonable even in a dense microcell network. A handover between two microcells is usually made on the basis of the criteria of the radio connection, on the basis of the level or quality of the received signal, for example. The system may, in addition, include other handover types, such as a power budget handover.

A deficiency in the present-day networks which are hierarchically divided into microcells and macrocells is that there is no way of making it possible to direct mobile stations to macrocells and microcells according to their power levels, in other words, low power mobile stations to microcells, and high power mobile stations to macrocells. As a result, a mobile station may unnecessarily use a cell which fits worse to it as far as the cell size is concerned, which results in an inefficient utilization of the network capacity and may cause a considerable increase in the number of handovers.

SUMMARY OF THE INVENTION

The object of the present invention is a traffic control method in a hierarchical radio network so that low-power mobile stations are primarily directed to microcells, and high-power mobile stations are primarily directed to macrocells.

This object is achieved by the method of the invention, which method is characterized by controlling the traffic by means of handovers so that, apart from measurements of the radio path, the transmitting power class of the mobile station and the cell type of the neighboring cell are also taken into account in the handover decision so that only a neighboring cell of the cell type which the mobile station should primarily use on the basis of its transmitting power class is selected as the target cell for the handover.

According to the invention, cells are classified into microcells and macrocells on the basis of the highest transmitting power which a mobile station is allowed to use in the cell. This can be done by comparing the highest allowed transmitting power to one or more threshold values. If the maximum allowed transmitting power is higher than the threshold power set for the macrocell, the cell is considered a macrocell. If the allowed transmitting power is lower than the threshold value set for the microcell, the cell is considered a microcell. Then, the aim is to direct a mobile station by a handover to a cell of the type that fits best to the maximum transmitting power of the mobile station, i.e. to a microcell or a macrocell. Thus, low-power mobile stations are directed to microcells and high-power mobile station to macrocells. The power class of a mobile station can be determined by comparing the maximum power level of the mobile station to the aforementioned threshold values set for the microcells and macrocells. If the maximum transmitting power of the mobile station is higher than the threshold value set for the macrocell, the mobile station should primarily use macrocells. If the maximum transmitting power of the mobile station is lower than the threshold value set for the microcell, the mobile station should primarily use microcells. This way, the different types of mobile stations can be made to use the right type of cell whenever it is possible as far as the radio path is concerned. If the system simultaneously employs a power budget handover, it may cause a mobile station to be handed over from the right type of cell to a wrong type of cell. For this reason, in the primary embodiment of the invention, each cell is assigned a group of neighboring cells of the type to which a power budget handover is allowed from the cell. Thus, a power budget handover to a cell of the wrong type is blocked.

BRIEF DESCRIPTION OF THE DRAWINGS

In the following, the invention will be described in greater detail with reference to the accompanying drawings in which.

DETAILED DESCRIPTION OF PREFERRED EMBODIMENTS OF THE INVENTION

The present invention can be applied to any cellular radio network, such as the Pan-European mobile system GSM (Global System for Mobile Communications), NMT (Nordic Mobile Telephone), DSC1800 (Digital Communication System), PCN (Personal Communication Network), UMC (Universal Mobile Communication), UMTS (Universal Mobile Communication System, FPLMTS (Future Public Land Mobile Telecommunication System), etc.

As far as the present invention is concerned, it is only essential that a mobile communication system be in use, at least locally, and, further, that there be a macrocell network which geographically at least partly overlays the microcell network.

As is well known, in cellular radio networks, the geographical area covered by a network is divided into smaller, separate radio coverage areas, i.e. cells, so that a mobile station currently in a cell communicates with the network by radio through a base station which is a fixed radio station located in the cell. Mobile stations can freely move from one cell to another.

Figure 1:
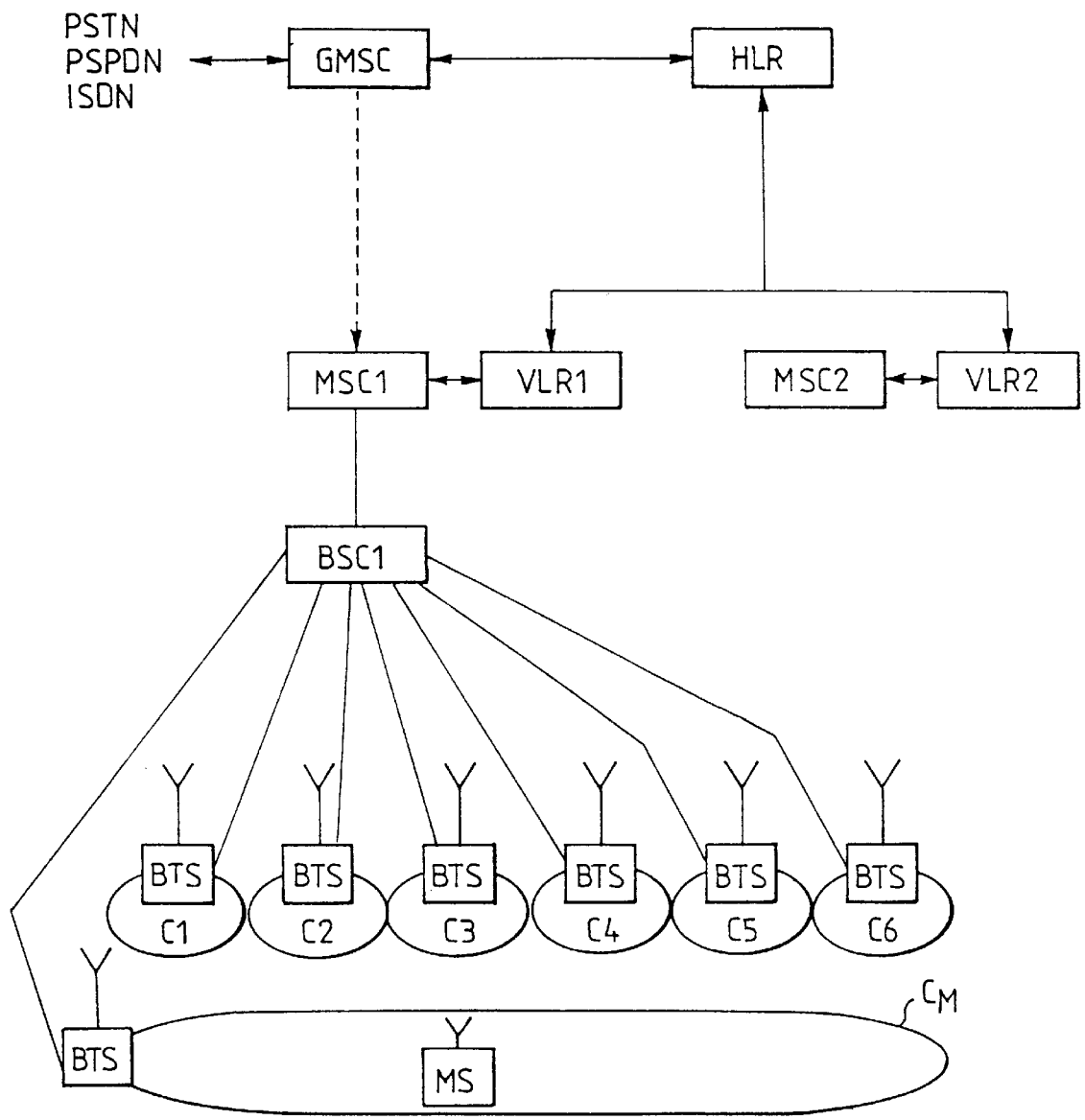
FIG. 1 illustrates a cellular mobile communication system of the invention.

FIG. 1 illustrates a mobile communication system with a hierarchically and geographically overlaying microcell and macrocell network. The exemplary system shows a fixed network in accordance with a GSM mobile system, but the invention can be implemented in the structure of any fixed network. The fixed network of the GSM system includes at least a home location register HLR, visitor location registers VLR, mobile switching centers MSC and base station controllers BSC which are connected to base stations BTS of the network. More accurate location information of the subscriber, in other words, the location area, is stored in the visitor location register VLR. There is typically one VLR per each mobile switching center MSC. The home location register HLR permanently maintains the subscriber data of the subscriber and information of which VLR area the mobile station MS is in. The structure of the GSM system and its operation are described in greater detail in the GSM recommendations and in "The GSM System for Mobile Communications", M. Mouly & M. Pautet, Palaiseau, France, ISBN: 2-9507190-0-7.

In the example of FIG. 1, there are two mobile services switching center areas, the first of which containing the mobile switching center MSC1 as well as visitor location register VLR1, and the second containing the mobile switching center MSC2 and the visitor location register VLR2. Under both MSCs there are one or more base station controllers BSC each of which controls several base stations BTS. FIG. 1 only shows one base station controller BSC1 which controls the base stations BTS of microcells C1, C2, C3, C4, C5 and C6, as well as the base station BTS of one macrocell $C_M$. Each base station BTS communicates via a duplex connection with mobile stations MS that are located in a corresponding cell. For reasons of clarity, FIG. 1 only shows one mobile station MS.

In FIG. 1, microcells C1–C6 belong to a microcell network primarily used by mobile stations MS that have a relatively low transmitting power and that are relatively immobile, such as hand-held mobile stations. The macrocell $C_M$ of the macrocell network geographically at least partly overlays the microcells C1–C6 of the microcell network. The macrocell network is primarily used by mobile stations that have a high transmitting power and that move relatively fast, such as vehicle-mounted radio stations.

Thus, mobile stations can switch from one cell to another as they move in the mobile communication network. If a mobile station MS does not have an ongoing call, the cell crossover only means registering to a new cell. If a mobile station MS is handling a call, the cell crossover process also includes switching the call from one traffic channel to another within a same cell, or in a new cell, i.e., a handover.

The mobile station MS determines the need for a handover by continuously measuring the level and often also the quality of the signal received from the base station of the serving cell, and, in addition, the level of the signal received from base stations of at least a few neighboring cells. Alternatively, or in addition, base stations can also measure the level and quality of signals transmitted by mobile stations. Depending on the mobile system, the decision on switching cells is made either by the mobile station or the fixed network. A handover is normally carried out on the basis of criteria of the radio path, but it can be performed due to other reasons as well, for example, load sharing or in order to decrease transmitting power levels. In radio networks, the aim is to avoid unnecessarily high power levels and thus interference elsewhere in the network.

In accordance with the GSM technical recommendations, for example, a mobile station MS monitors (measures) the level and quality of the downlink signal of the serving cell, and the level of the downlink signal of the neighboring cells of the serving cell. Each base station BTS monitors (measures) the level and quality of the uplink signal received from each mobile station MS served by respective base station BTS. All the measurement results are transmitted to the respective base station controller BSC. Decisions on handovers during on-gQing calls are made by a base station controller BSC on the basis of various handover parameters assigned to each cell, and on the basis of measurement results reported by the mobile stations MS and base stations BTS. Alternatively, all decisions on a handover can be made at a mobile services switching center MSC to which all the measurement results are in such a case transmitted. An MSC also controls at least those handovers occurring from the area of one base station controller to the area of another.

If a mobile station MS roams in a radio network, a handover from the traffic channel of the serving cell to the traffic channel of a neighboring cell is normally performed either (1) as the measurement results of the mobile station MS and/or the base station BTS indicate a low signal level and/or quality from the current serving cell and that a better signal level can be obtained from a neighboring cell, and/or (2) as a neighboring cell enables communication at lower transmitting power levels, in other words, as the mobile station MS is in a border area between cells. The first is a handover which is based on the criteria of the radio path, which handover will from here on be referred to as an RR handover, and the latter is a power budget handover which will from here on be referred to as a PBGT handover.

In a PBGT handover, the criterion on the basis of which a neighboring cell is selected for the handover is that the mobile station is always connected to a cell having the minimum radio path attenuation, even if the measurements of signal quality and level indicated another cell better. In practice, the radio path attenuation can be obtained by calculating the power budget PBGT(n) of the neighboring cell (n), for example, in the following way:

PBGT(n)=MS_TXPWR_MAX-AV_RXLEV_DL_HO-(BS_TXPWR_MAX-BS_TXPWR)-(MS_TXPWR_MAX(n)-AV_RXLEV_NCELL(n))

BS_TXPWR_MAX represents the maximum downlink power allowed to be used in the serving cell, and BS_TXPWR represents the actual downlink transmitting power in the serving cell. MS_TXPWR_MAX and MS_TXPWR_MAX(n) represent the maximum uplink transmitting power allowed to the mobile station MS in the serving cell, and, respectively, in the neighboring cell n. AV_RXLEV_DL_HO and AV_RXLEV_NCELL(n) represent the average measured signal level received at the mobile station MS from the serving cell, and, respectively, from the neighboring cell n. Normally, a power budget handover is possible if PBGT(n)>HO_MARGIN_PBGT (n), in which HO_MARGIN_PBGT(n) is the margin which the power budget of the neighboring cell n must exceed in order for the handover to become possible.

In an RR handover, the criterion used is the signal strength or quality. In such a case, the handover to a neighboring cell can be carried out, e.g., in case $$AV\_RXLEV\_NCELL(n) > AV\_RXLEV\_DL\_HO + HO\_MARGIN\_LEVEL/QUAL(n).$$

In such a case, it depends on the reason for the handover, which type of margin is employed in the decision making. HO_MARGIN_LEVEL is employed if the reason for the handover is signal strength, and HO_MARGIN_QUAL is employed if the reason for the handover is signal quality.

These conventionally employed types of handover also enable a mobile station MS handover from a microcell to a macrocell and vice versa. For example, a mobile station of a low transmitting power class can switch from a microcell to an "overlaying" macrocell on the basis of the criteria of the radio path. Handover algorithms based on criteria of the radio path only are not able to direct mobile stations of different power classes to cells that fit their size, and it is not their purpose, either.

According to the invention, traffic is controlled by a handover in which, apart from measurements of the radio path, the transmitting power class of the mobile station and the cell type of the neighboring cell are also taken into account so that only a neighboring cell of the cell type which the mobile station should primarily use on the basis of its transmitting power class can be selected as the target cell for the handover. This new type of handover which takes into account both the cell type and the transmitting power class of the mobile station is referred to as an MM handover in this document. It is possible to activate an MM handover in an entire network, or only in a part of the network. The activation can be controlled cell-specifically and it is carried out to all those cells (both microcells and macrocells) that are located within the hierarchical network.

Figure 2A:
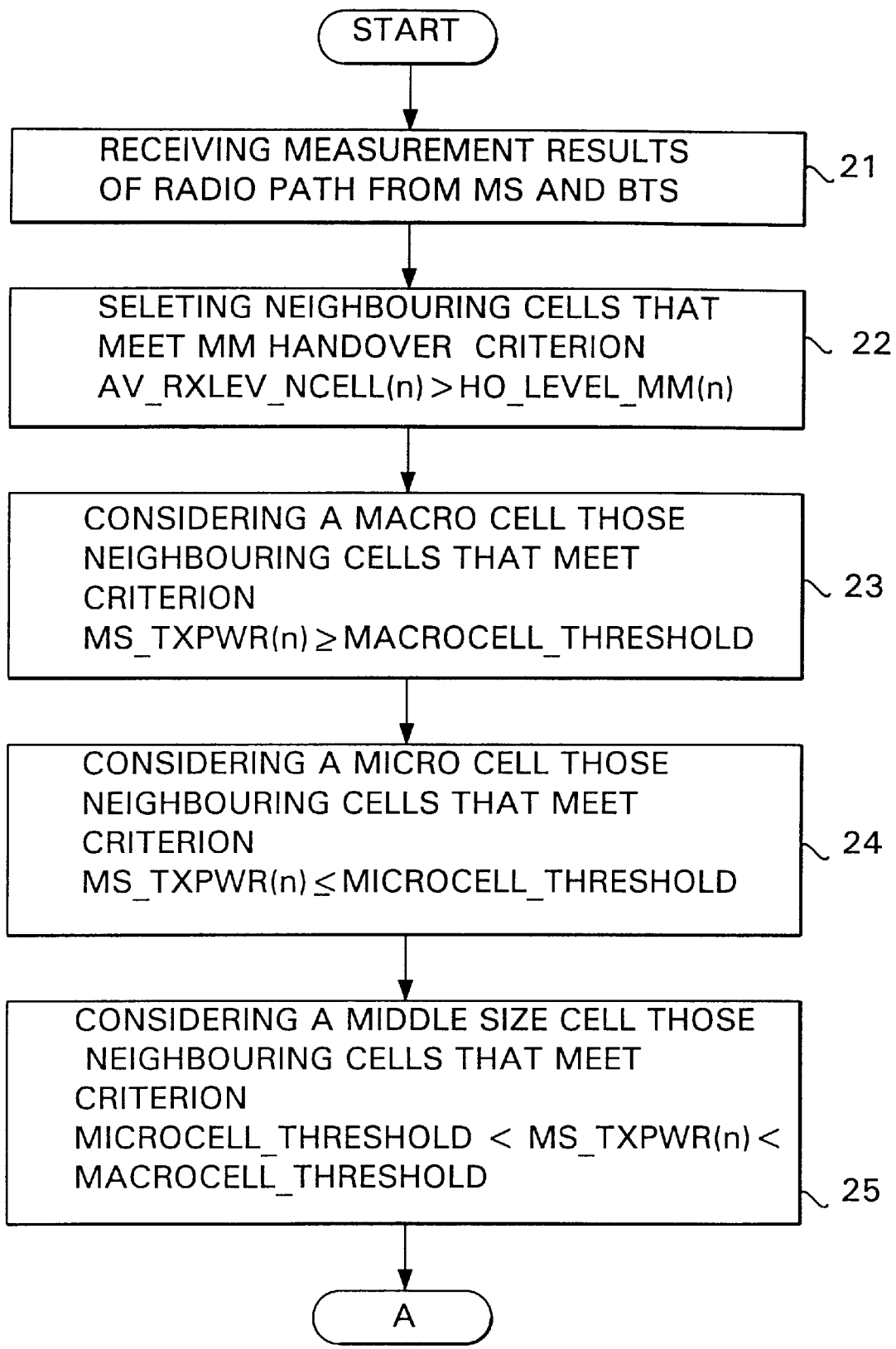
FIGS. 2A and 2B are flow charts illustrating a handover for traffic control according to the invention.
Figure 2B:
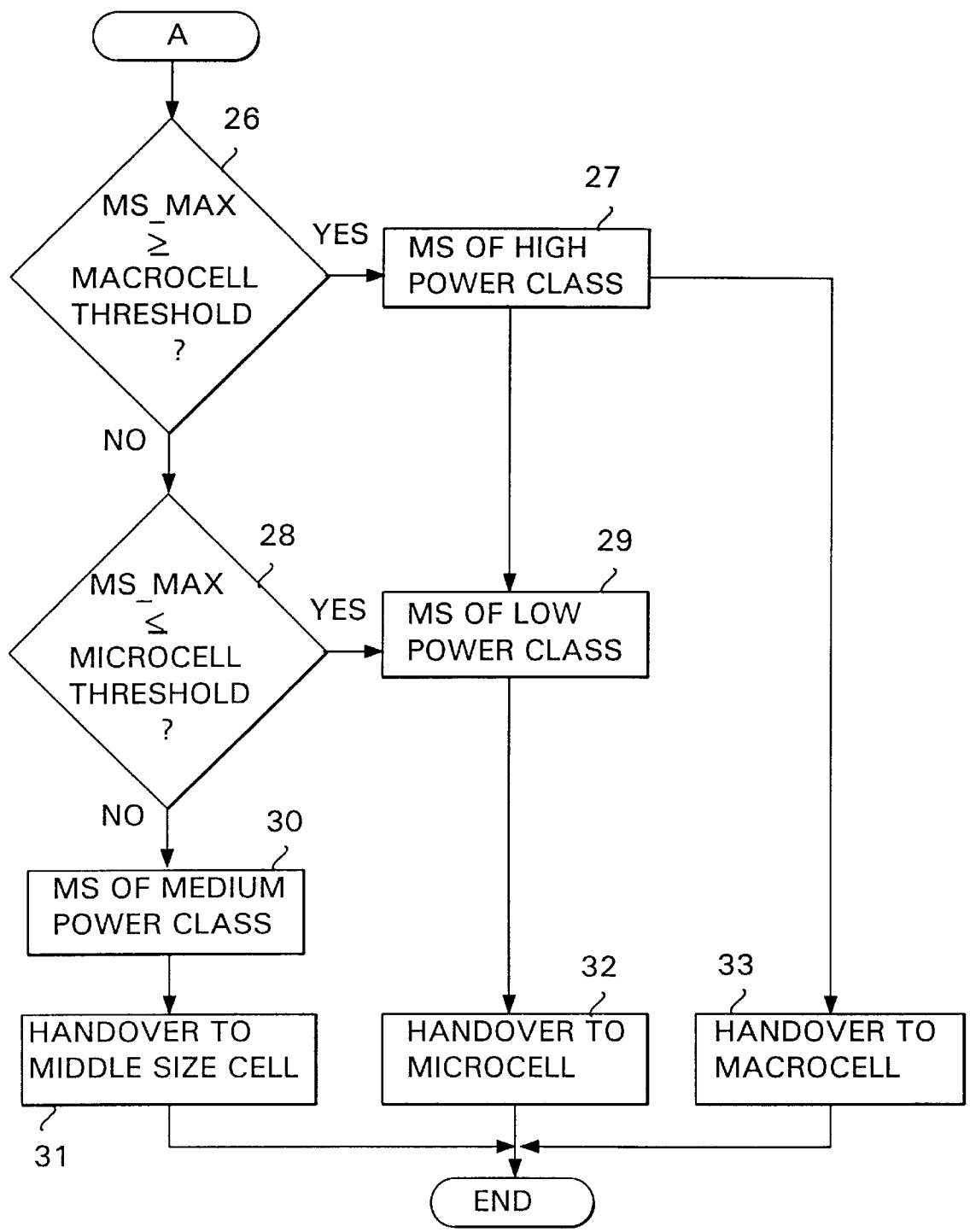

Referring to FIGS. 2A and 2B, as an MM handover is employed, a respective base station controller BSC carries out the following threshold value comparison at predetermined intervals on the basis of measurement results it has received from a respective mobile station MS, and possibly base stations BTS (block 21), in order to examine the properties of the radio connection (block 22).

$$AV\_RXLEV\_NCELL(n) > HO\_LEVEL\_MM(n)$$

in which AV_RXLEV NCELL(n) represents the average signal level which the mobile station receives from the neighboring cell n, and HO_LEVEL_MM(n) represents the level which the signal level of the neighboring cell n must exceed in order for the MM handover to be possible. This threshold level is separately set for each neighboring cell.

Besides the radio link properties, the MM handover of the invention also takes into account the power class of the mobile station MS so that only neighboring cells that fit the mobile station MS are selected as target cells, in other words, the base station controller BSC selects macrocells for vehicle-mounted mobile stations and portable mobile stations MS, and microcells for hand-held mobile stations MS.

The base station controller BSC uses two threshold values for determining the cell type of the neighboring cell: MACROCELL THRESHOLD and MICROCELL THRESHOLD. These threshold values indicate the type of a cell by means of the maximum transmitting power level that the mobile stations MS are allowed to use in the cell. The same threshold values are used for all cells in determining the cell type.

MACROCELL THRESHOLD determines the size of a macrocell as follows (block 23):

if the maximum transmitting power level MS_TXPWR (n) that the mobile station is allowed to use on a traffic channel in the neighboring cell is higher than or equal to MACROCELL THRESHOLD, the neighboring cell is considered a macrocell.

MICROCELL THRESHOLD determines the size of a microcell as follows (block 24):

if the maximum transmitting power level MS_TXPWR (n) that the mobile station MS is allowed to use on a traffic channel in a neighboring cell is lower than or equal to MICROCELL THRESHOLD, the neighboring cell is considered a microcell.

MACROCELL THRESHOLD and MICROCELL THRESHOLD can be chosen so that a predetermined power range is left between them. Cells whose maximum transmitting power MS_TXPWR(n) which a mobile station is allowed to use in the cell falls between MICROCELL THRESHOLD and MACROCELL THRESHOLD are referred to as middle size cells (block 25).

As the neighboring cells offering an adequate quality for radio connection have been found and their cell types have been determined as described above, the base station controller also determines the power class of the mobile station MS and, apart from the properties of the radio connection, takes that into account in selecting a target cell as follows:

if the maximum transmitting power MS_MAX of the mobile station MS to be handed over is higher or equal to MACROCELL THRESHOLD (block 27), the mobile station is considered a mobile station of a high power class, which should primarily use a macrocell. In such as case, the base station controller BSC only allows the MM handover of the mobile station MS to a cell considered a macrocell (block 33).

if the maximum transmitting power MS_MAX of the mobile station to be handed over is lower or equal to MICROCELL THRESHOLD (block 28), the mobile station is considered a mobile station of a low power class, which should primarily use a microcell (block 29). In such a case, the base station controller BSC only allows the MM handover of the mobile station MS to a cell considered a microcell (block 32).

if the maximum transmitting power MS_MAX of the mobile station to be handed over is lower than MACROCELL THRESHOLD and higher than MICROCELL THRESHOLD, the mobile station is considered a mobile station of a medium power class, which should primarily use middle size cells (block 30). In such a case, the base station controller BSC only allows the MM handover of the mobile station MS to a cell considered a middle size cell (block 31).

The handover procedure described above efficiently directs mobile stations MS to cells according to their power classes. For example, if a vehicle-mounted mobile station MS initiates a call from a microcell, the call will be handed over as soon as possible to a macrocell by an MM handover according to the method of the invention, i.e. whenever a macrocell can offer a free traffic channel and adequate radio path properties. Correspondingly, if a hand-held mobile station MS initiates a call from a macrocell, or it has been handed over to a macrocell because of radio path criteria or for some other reason, the call will be handed over to a microcell by the method of the invention as soon as a microcell can serve the call well enough, i.e. offer a free traffic channel and adequate radio path properties. Vehicle-mounted mobile stations MS will remain in macrocells and hand-held mobile stations in microcells for as long as the radio path properties are good. If, for example, a hand-held mobile station MS moves from one microcell coverage area to another, a handover caused by radio path criteria will be carried out normally: the target cells may be microcells or macrocells.

In an embodiment of the invention, simultaneous threshold value comparisons of both MM handover and a power budget handover are carried out. In cases the MM handover and the power budget handover are employed simultaneously, the power budget handover is only allowed between cells of the same size. In other words, the power budget handover is allowed from a macrocell to a macrocell, from a microcell to a microcell, but not from a macrocell to a microcell or vice versa. For a power budget handover, each cell can be assigned neighboring cells to which the power budget handover is allowed from the serving cell. The size of the serving cell and the neighboring cell can be determined similarly to the MM handover described above. If the power budget handover were also allowed between cells of different sizes, it could direct mobile stations MS to cells of wrong size as far as the power classes of the mobile stations are concerned, and thus the method of the invention could become less efficient.

The drawings and verbal description are only intended to illustrate the present invention. The invention may vary in details within the scope and spirit of the attached claims.

We claim:

1. A method for controlling traffic in a hierarchical mobile communication system which has a first plurality of mobile stations of a relatively lower transmitting power class, and a second plurality of mobile stations of a relatively higher transmitting power class, a microcell network of a first plurality of cells maintained primarily for use by mobile stations of said first plurality of mobile stations, and a macrocell network of a second plurality of cells maintained primarily for use by mobile stations of said second plurality of mobile stations, said macrocell network at least partly overlaying said microcell network, said macrocell network being characterized by a relatively larger cell size and said microcell network being characterized by a relatively smaller cell size, said method comprising the steps of:

effecting traffic control handovers of said mobile stations in said system, by taking into account in deciding on each said traffic control handover, apart from measurements of a respective radio path, the transmitting power class of the respective mobile station, and which network a respective candidate cell for the respective traffic control handover is in, and only selecting said candidate cell for said handover if the respective candidate cell is in the respective said network primarily maintained for use by mobile stations of the respective plurality mobile station; and allowing power budget handovers of said mobile stations to be made in said system only between cells which, for each said power budget handover, are of a same network as is maintained primarily for use by mobile stations of the respective said plurality of mobile stations which includes the respective mobile station.

2. The method of claim 1, further comprising;

assigning to each said cell a predetermined group of cells as neighboring cells all of which are candidates for a power budget handover from the respective said cell.

* * * * *